(12) United States Patent
Inoue et al.

(10) Patent No.: US 6,723,947 B2
(45) Date of Patent: Apr. 20, 2004

(54) LASER BEAM HARDENING DEVICE

(75) Inventors: Toshihiko Inoue, Komaki (JP); Masaki Itoh, Aichi-ken (JP); Toshihiko Asari, Komaki (JP); Naoomi Miyagawa, Gifu (JP)

(73) Assignee: Yamazaki Mazak Kabushiki Kaisha (JP)

( * ) Notice: Subject to any disclaimer, the term of this patent is extended or adjusted under 35 U.S.C. 154(b) by 16 days.

(21) Appl. No.: 10/122,838

(22) Filed: Apr. 15, 2002

(65) Prior Publication Data

US 2002/0153358 A1 Oct. 24, 2002

(30) Foreign Application Priority Data

Apr. 20, 2001 (JP) ........................................ 2001-121884

(51) Int. Cl.⁷ ............................................... B23K 26/00
(52) U.S. Cl. ................................ 219/121.6; 219/121.78
(58) Field of Search ........................ 219/121.6, 121.82, 219/121.78, 121.79, 121.8, 121.81

(56) References Cited

U.S. PATENT DOCUMENTS 4,794,222 A * 12/1988 Funayama et al. ..... 219/121.78
5,229,572 A * 7/1993 Ito ......................... 219/121.67

* cited by examiner

Primary Examiner—M. Alexandra Elve
(74) Attorney, Agent, or Firm—Richard P. Gilly, Esq.; Wolf, Block, Schorr and Solis-Cohen LLP (57) ABSTRACT

A saddle 18 is movable along a guide means 16 provided, passing through an neighborhood of machining area MA of a plurality of machine tools 1, 2. The saddle 18 is provided with a machining head 33, being free to selectively insert in and retreat from the machining area MA, and a plurality of kinds of nozzles 48 for ejecting laser beam. The nozzle 48 suitable for a portion of workpiece 3, 4 to be hardened is selected so as to attach it to the machining head 33. When hardening is instructed, the nozzle 48 is moved to a desired position with respect to the workpiece 3, 4 in the state of the workpiece 3, 4 located on the machine tool 1, 2, and the laser beam 51 is ejected from the nozzle 48 so as to harden the workpiece 3, 4.

4 Claims, 6 Drawing Sheets

LASER BEAM HARDENING DEVICE

BACKGROUND OF THE INVENTION

This invention relates to a laser beam hardening device for hardening a part of a workpiece, and in particular, relates to a laser beam hardening device suitable for hardening a workpiece on a machine tool.

As a device for partially hardening a workpiece, there is a laser beam hardening device. Wide experience is necessary for setting working conditions, such as setting the shape of a workpiece, setting the portion or bounds of workpeice to be hardened or their working methods since the direction of laser beam irradiated from a machining head is constant in a conventional laser beam hardening device.

When workpieces to be hardened with laser beam should be produced in large quantities, it is sufficient to provide an exclusive laser beam hardening device for only such workpieces. Thereby workpieces having constant quality can be machined without depending on a worker's experience. When many kinds of workpieces should be produced in small quantities (especially, when one article should be produced), it is impossible to provide a laser beam hardening device exclusive for the workpiece for economical reasons.

Besides, concerning a workpiece requiring high accuracy, after-routine owing to heat indication at the time of hardening, such as re-polishing may be necessary. In this case, a workpiece taken out of a machine tool should be attached to the machine tool again after hardening so as to machine. At the result, the work for hardening routine takes longer time. And, machining accuracy may be decreased owing to the dispersion of reproducibility of a position when a workpiece is attached to a machine tool. The object of the present invention is to provide a laser beam hardening device capable of improving productivity of workpieces without a specific skill, having shorter time for hardening routine, taking the above-mentioned circumstances into consideration.

SUMMARY OF THE INVENTION

The present invention is laser beam hardening device, comprising a guide means provided passing through a neighborhood of machining area of a plurality of machine tools having a saddle provided at said guide means, being free to move along said guide means.

The laser beam hardening device further comprises a machining head provided at said saddle, being free to selectively insert in and retreat from said machining area of a plurality of said machine tools and a nozzle attachably and detachably provided at said machining head, being capable of ejecting laser beam.

Additionally, the laser beam hardening device comprises a nozzle holder capable of attachably and detachably holding said nozzles and a nozzle exchanging means for exchanging said nozzle between said machining head and said nozzle holder.

Hardening can be performed in such a manner that the machining head of the laser beam hardening device, installing the nozzle fitting for the portion of a workpiece to be hardened, is moved to a workpiece located at the machining area of each machine tool. Laser beam is exposed to a necessary portion of the workpiece; thereby hardening is possible without specific skill. Even in the case where after-routine due to heat indication at the time of hardening, such as polishing, is necessary, the after-routine can be immediately performed since the workpiece is set on the machine tool. Then, the machining accuracy does not decrease since it is not necessary to attach a wokpiece to the prior place of a machine tool again. Thus the attaching place of the workpiece does not vary.

Besides, the time for hardening routine can be shortened so as to improve the productivity of a workpiece. And, continuous hardening work is possible concerning a plurality of machine tools with one laser beam hardening device since the machining head is free to selectively insert in and retreat from the machining area of a plurality of machine tools. Thus it's working efficiency is high.

The laser beam hardening device may have a guide means, passing through an upper area of said machining area of a plurality of said machine tools.

Accordingly, the guide means is not an obstruction when a workpiece is carried in and carried out of each machine tool and machine tools are maintained, in addition to the effects of the invention.

The laser beam hardening device may also have nozzle exchanging means having a driving means for driving said nozzle holder and said machining head being free to relatively close to and apart from each other.

Furthermore the freedom degree concerning the position of the machining head increases and the workpiece having complex shape can be dealt with, in addition to the effects of the invention.

The laser beam hardening device may also have a nozzle holder that can be moved along said guide means together with said saddle.

Accordingly, it is not necessary to move the saddle along the guide means when the nozzle is exchanged, and the nozzle can be exchanged in a short time so as to improve workability, in addition to the effects of the invention.

The laser beam hardening device may also have a nozzle exchanging means, which has a magazine providing a plurality of said nozzle holders. The plurality of nozzles can be exchanged in a short time, and then workability can be improved, in addition to the effects of the invention.

The laser beam hardening device may also have a plurality of said nozzles, and an optical path having different form of ejecting laser beam is formed at each nozzle.

Accordingly, a plurality of nozzles suitable for the part to be hardened of the workpiece, which is an object of hardening work, can be located, and the workpiece having more complex shape can be also dealt with, in addition to the effects of the invention.

DESCRIPTION OF THE PREFERRED EMBODIMENTS

Embodiments of the present invention will now be explained hereinafter, referring to drawings.

Figure 1:
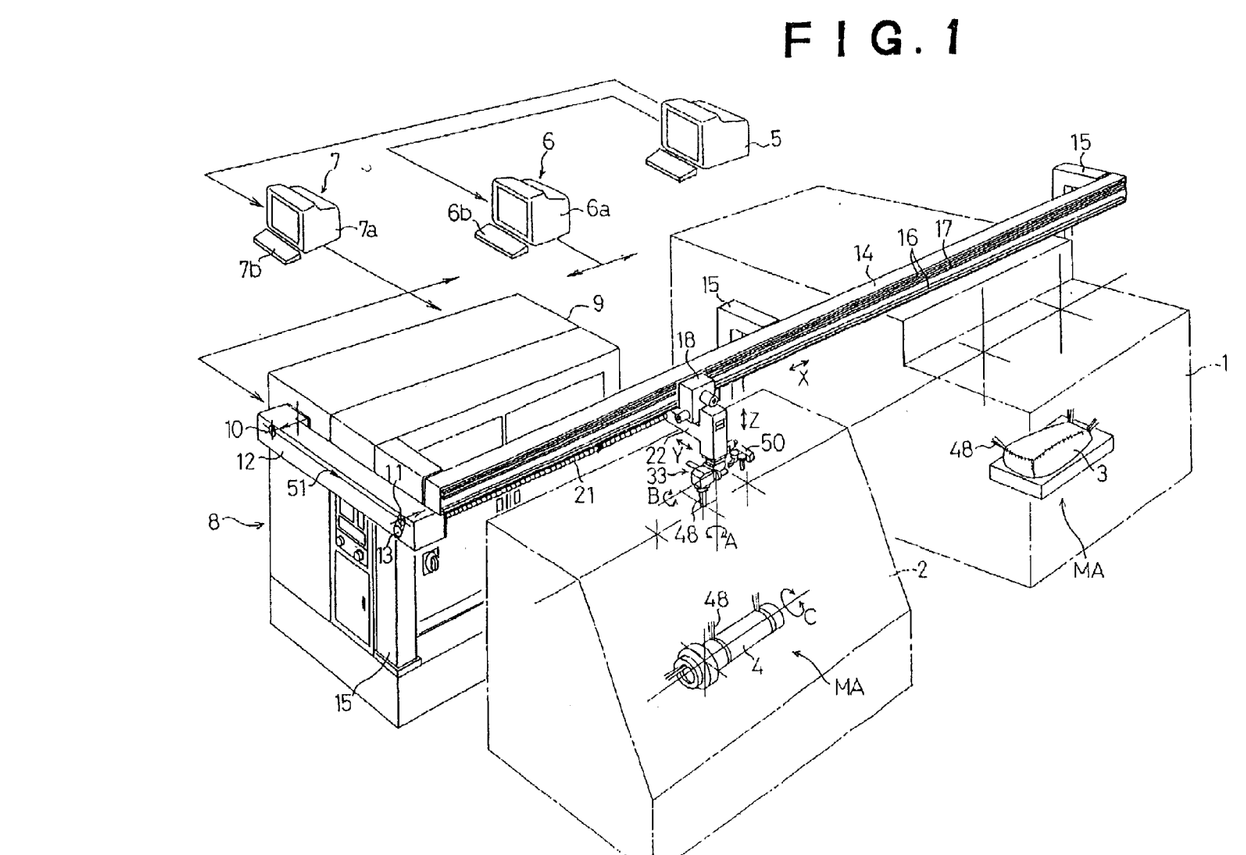
FIG. 1 is a perspective view for showing a condition of locating a laser beam hardening machine according to the present invention.
Figure 2:
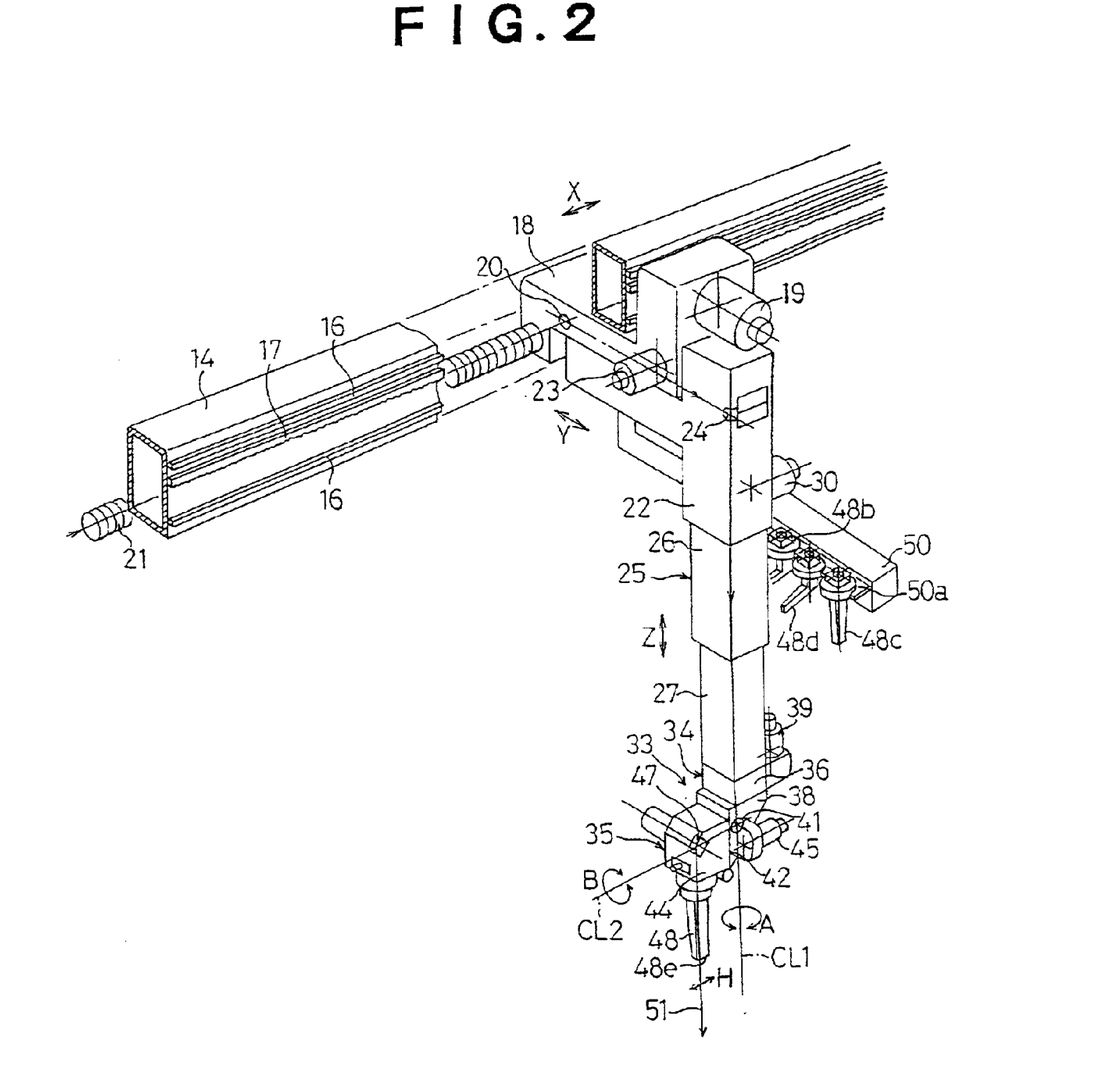
FIG. 2 is a perspective view for showing a movable portion of the laser beam hardening machine of FIG. 1.
Figure 3:
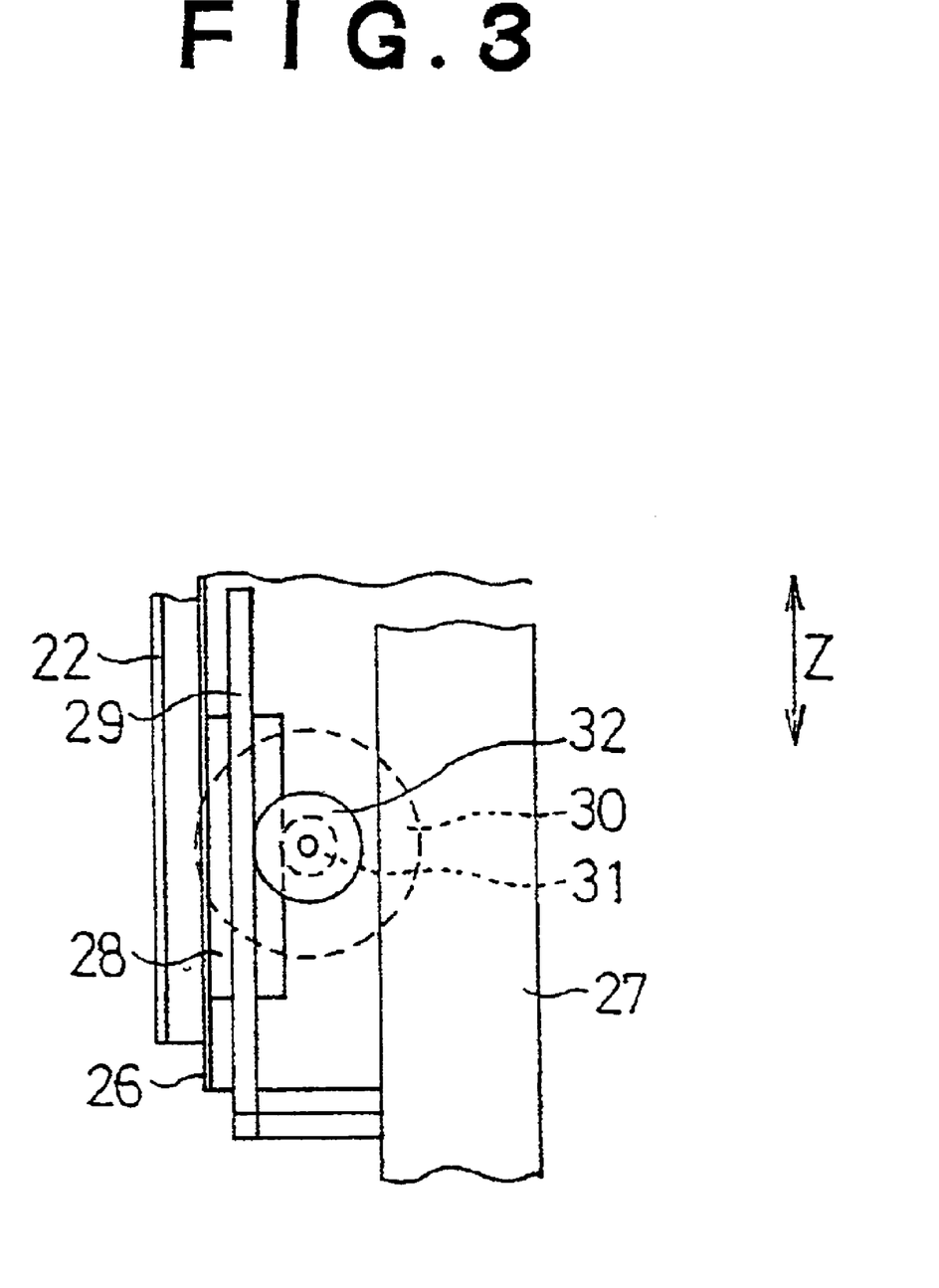
FIG. 3 is a sectional side elevation for showing a driving portion of a sleeve of FIG. 2.
Figure 4:
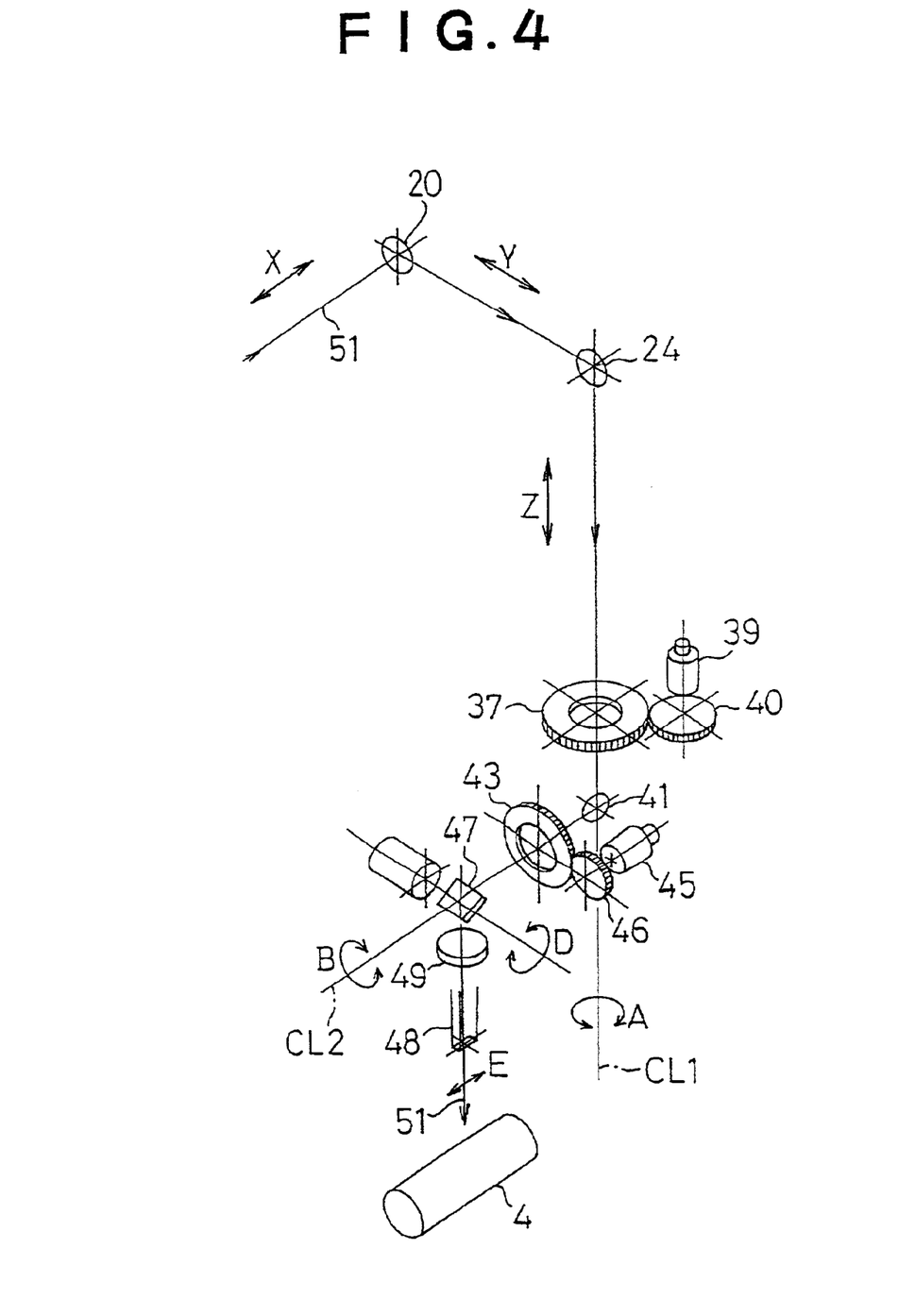
FIG. 4 is a view for showing a structure of driving mechanism of a machining head portion of FIG. 2.
Figure 5:
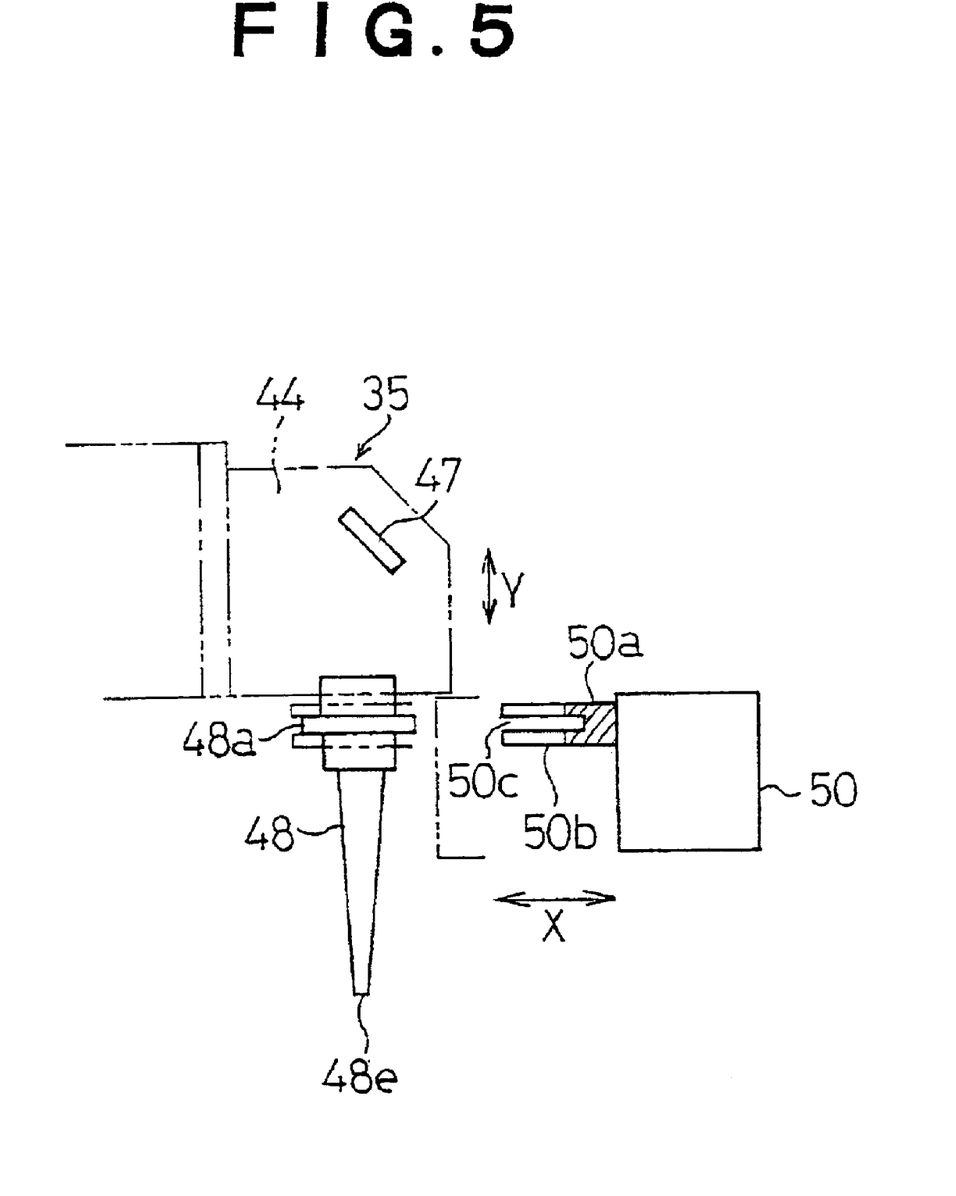
FIG. 5 is a front view for showing a relation between the machining head and a magazine of FIG. 2.
Figure 6:
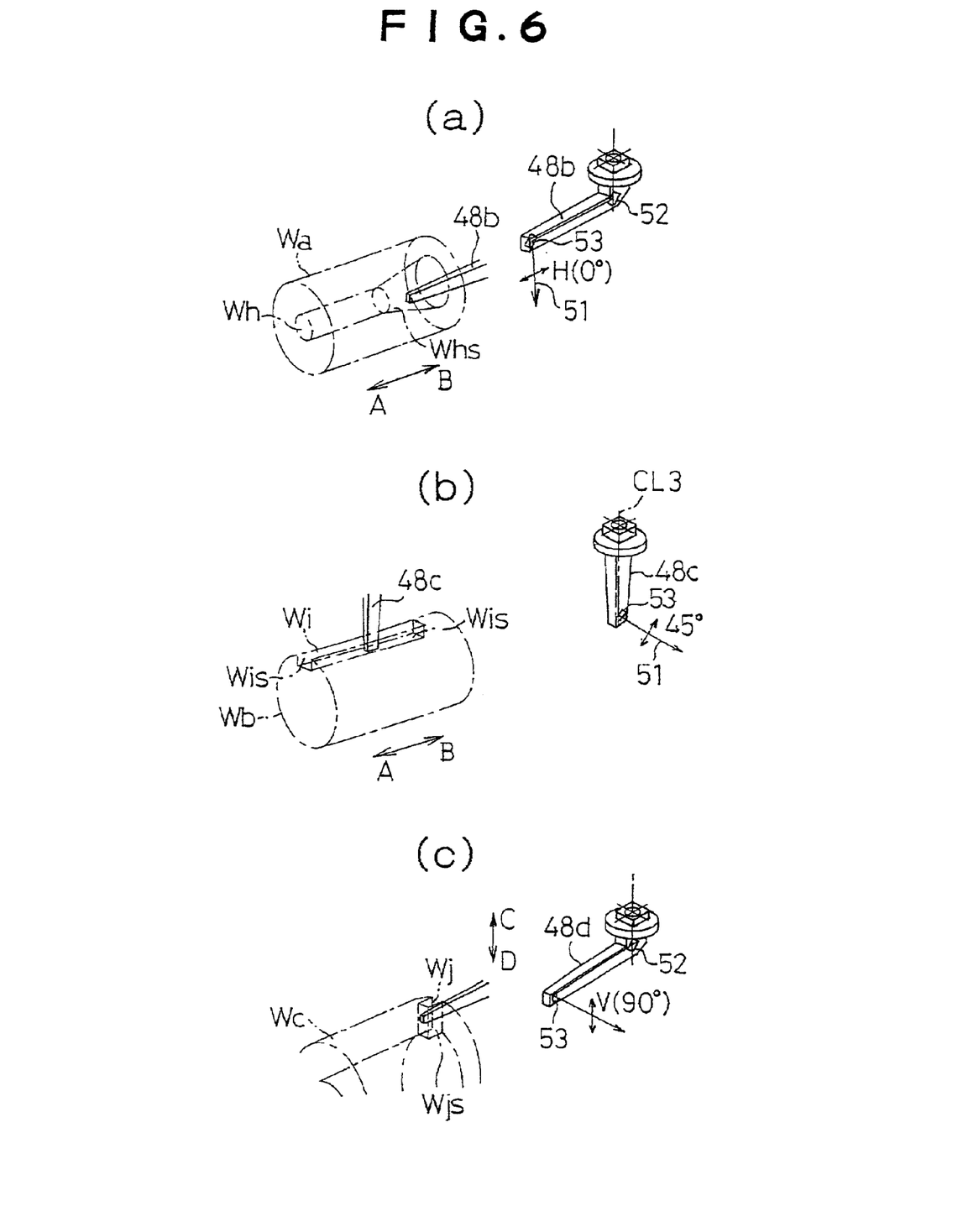
FIG. 6 is a perspective view for showing a portion to be hardened of a workpiece and a shape of a nozzle.

FIG. 1 is a perspective view for showing a location of a laser beam hardening machine and a machine tool according to the present invention. FIG. 2 is a perspective view for showing a movable portion of the laser beam hardening machine of FIG. 1. FIG. 3 is a sectional side elevation for showing a driving portion of a sleeve of FIG. 2. FIG. 4 is a view for showing a structure of driving mechanism of a machining bead portion of FIG. 2. FIG. 5 is a front view for showing a relation between the machining head and a magazine of FIG. 2. FIG. 6 is a perspective view for showing a portion to be hardened of a workpiece and a shape of a nozzle.

In FIG. 1, a machining center 1 and a numerically controlled lathe 2, each having a numerically controlled machine, as are machine tools for machining on workpieces 3, 4 through the instruction of each numerically controlled machine. Both machine tools are located such that the workpiece 3, 4 to be machined by both machine tools are positioned on almost the same straight line.

The workpiece 3, which is supported by a table, and located in a machining area MA where the workpiece of the machining center 1 is machined, can be moved in a direction as shown by an arrow X (or a direction by the arrow X and a direction by an arrow Y, which are horizontal directions, orthogonal to each other); and the workpiece 4, which is supported by a spindle, located in the machining area MA where the workpiece of the numerically controlled lathe 2 is machined, is free to rotate in a direction as shown by an arrow C.

In a CAD 5, design information of a plurality of workpieces, including the workpieces 3, 4, is input. A CAM 6 gets out the design information of the workpiece 3 (4) to be machined from CAD 5, designates a processing machine to be used (the machining center 1 or the numerically controlled lathe 2), and determines a machining position of the workpiece 3 (4) on the basis of a three dimensional CAD image displayed on a display 6a. Furthermore, the CAM 6 is used as an input device for inputting in the numerically controlled machine of the machining center 1 or the numerically controlled lathe 2 by inputting machining quantity and machining condition (for example, tool to be used, rotational speed of tool, cut of depth, feed per stroke and the like), necessitating hardening on the workpiece 3 (4), necessitating re-machining after hardening and its working condition through a keyboard 6b.

A CAM 7 gets out the design information of the workpiece 3 (4) to be machined from CAD 5, and determines the position to be hardened of the workpiece 3 (4), designated on the design drawings on the basis of the three dimensionally CAD image displayed on a display 7a. Furthermore, the CAM 7 computes hardening working condition, such as laser output, frequency, duty, assist gas, defocus quantity, beam amplitude, beam amplitude frequency and axis feeding quantity, from database registered in advance on the basis of the material (dimension) of the workpiece 3 (4), width to be hardened, depth to be hardened, which are input through a keyboard 7b, and is used as an input device for inputting the position to be hardened and the working condition in the numerically controlled machine of a laser beam hardening device 8.

A main body 9 of the laser beam hardening device 8 having a numerically controlled machine is provided with a laser beam oscillator and its control means. And, one side of the main body 9 is provided with an optical path 12 having a pair of reflecting mirrors 10, 11 for guiding laser beam 51 generated from the laser beam oscillator, so as to make it parallel to a guide described hereinafter. The diameter of the laser beam ejected from the optical path 12 can be adjusted by providing the reflecting mirror 11 with a beam diameter adjuster 13 comprising diaphragm mechanism.

A guide 14 is located in the direction as shown by the arrow X (horizontal direction) by three stanchions 15, and which passes through above the machining area MA of the machining center 1 and the numerically controlled lathe 2, so as to make it parallel to the arrangement of the workpieces 3, 4 to be machined with a plurality of the machine tools. This guide rail 14 is provided with a pair of rails 16 comprising guide means and a rack 17 located along this guide rail 16.

As shown in FIG. 2, a saddle 18 has a pinion (not shown) to be engaged with the rack 17 and a servo-motor for driving it, and is supported by the rails 16, the saddle 18 being free to move in the direction as shown by the arrow X. And, the saddle 18 moves to an optional position in the direction, as shown by the arrow X, by operating the servo-motor 19 so as to rotate the pinion. This saddle 18 is provided with an optical path for ejecting the laser beam 51, which beam is injected from the direction as shown by the arrow X to the direction as shown by the arrow Y, through a reflecting mirror 20 is located at its intersection. Besides, a stretchable path 21 is connected between this saddle 18 and the optical path 12.

A slider 22 is supported by the lower face of the saddle 18 through a guide means (not shown) similar to the case of the saddle 18, the slider 22 being free to move in the direction as shown by the arrow Y (horizontal direction), which is orthogonal to the direction as shown by the arrow X. On the upper face of this slider 22, a rack (not shown) is fixed so as to be parallel to the guide means of the rail. A servo-motor 23 fixing a pinion to be engaged with this rack is located on the saddle 18, and the slider 22 moves in an optional position, which is in the direction as shown by the arrow Y, by its operation. In this slider 22, an optical path is formed in order to inject the laser beam 51, where the laser beam 51 is ejected in the direction as shown by the arrow Y from the saddle 18 to the direction as shown by the arrow Z, at the intersection, whereby a reflecting mirror 24 is provided at the intersection. An optical path (not shown), similar to the stretchable optical path 21, is located between an ejection opening of the laser beam 51 of the saddle 18 and an injection opening of the laser beam 51 of the slider 22.

A sleeve 25 is comprised of an upper sleeve 26 to be slidably inserted into the slider 22 in the direction as shown by the arrow Z (vertical direction), and a lower sleeve 27 to be slidably inserted into the upper sleeve 26. As shown in FIG. 3, an inner face of the upper sleeve 26 is provided with a rack 28 extending in the direction as shown by the arrow Z. The lower sleeve 27 is provided with a rack 29, extending in the direction as shown by the arrow Z, and being parallel to the rack 28 having predetermined interval. A servo-motor 30 located on the slider 22 is provided with a pinion 31 to be engaged with the rack 28 having small diameter and a pinion 32 to be engaged with the rack 29 having long diameter (the diameter is twice as long as the small pinion 31). The lower sleeve 27 moves twice as rapidly as the upper sleeve 26 when the servo-motor 30 is operated. This sleeve 25 is provided with an optical path for passing through the laser beam 51, which is ejected from the slider 22 in the direction as shown by the arrow Z, and ejecting it in the direction as shown by the arrow Z.

A machining head 33 is comprised of a base 34, supported by the lower end of the lower sleeve 27, the base 34 being free to swing in the direction as shown by an arrow A with a vertical axial center CL1 of the lower sleeve 27 as its center, and comprised of a top end portion 35 supported by the side face of this base 34, the top end portion 35 being free to swing in the direction as shown by an arrow B with a horizontal center line CL2 orthogonal to the swing center of the base 34 as its center.

The base 34 of the machining head 33 is comprised of a fixed portion 36 fixed at the lower end of the lower sleeve 27, a wheel 37 rotatably supported in this fixed portion 36 as shown in FIG. 4, a movable portion 38 supported by the wheel 37, a servo-motor 39 supported by the fixed portion 36 and a wheel 40 supported by the servo-motor 39 so as to engage with the wheel 37. Then, the movable portion 38 swings at an optional angle in the direction as shown by the arrow A, with the vertical axial center CL1 as its center in the horizontal face, by the operation of the servo-motor 39. The base 34 is provided with an optical path for ejecting the laser beam 51 in the direction as shown by the arrow Z, injected from the lower sleeve 27 from the horizontal direction, where a reflecting mirror 41 is provided at the intersection.

The top end portion 35 of the machining head 33 is comprised of a fixed portion 42 fixed on a side opposed to the reflecting mirror 41 of the movable portion 38, a wheel 43 (see FIG. 4) rotatably supported by the fixed portion 42, a movable portion 44 supported by the wheel 43, a servo-motor 45 supported by the fixed portion 42 and a wheel 46 fixed by the servo-motor 45 so as to engage with the wheel 43. Then, the movable portion 44 swings at an optional angle in the direction as shown by the arrow B with the horizontal center line CL2 as its center in the vertical face by the operation of the servo-motor 45. At the top end portion 35, an optical path is formed in order to eject the laser beam 51, which is injected from the base 34 in the horizontal direction, in the vertical direction. A galvanomirror 47, being free to oscillate in the direction as shown an arrow D, is located at the intersection, as a reflecting mirror so as to give desired beam amplitude, beam amplitude frequency to the laser beam 51.

At the top end portion 35 of the machining head 33, a supply opening of assist gas is formed and is connected with a supply source of the assist gas although these are not shown in the figure.

A nozzle 48, having a flange 48a at its outer periphery, is attachably and detachably supported by the top end portion 35 of the machining head 33. This nozzle 48 has a condensing lens 49 on the side attaching to and detaching from the machining head 33 as shown in FIG. 4 and an optical path for passing through the laser beam 52, which is injected in the vertical direction when reflected by the galvanomirror 47 and irradiating the workpiece 3 (4) at its axial center.

On the side of the nozzle 48, an assist gas supply opening is formed, communicating with the supply opening of the assist gas formed at the top end portion 35 of the machining head 33. The assist gas supply opening on the machining head 33 side and the assist gas supply opening of the nozzle 48 side are connected with each other when the nozzle 48 is attached to the machining head 33 so as to supply the lower portion of the condensing lens 49 in the nozzle 48 (between the condensing lens 49 and the workpiece 3 (4)) with the assist gas.

This type of nozzle 48 is used for hardening the surface facing the galvanomirror 47 of the workpiece 3 (4) attached to the machining center 1 or the numerically controlled lathe 2. The laser beam 51, reflected by the galvanomirror 47 is directly irradiated on the workpiece 3 (4) through the condensing lens 49.

As shown in FIG. 2, a magazine 50 is supported by the saddle 18 and by a guide means (not shown), being free to move in the arrow X direction, and is driven by a driving source (not shown). As shown in FIG. 2 or FIG. 5, the magazine 50 has a slot 50b in the U character shape that is seen from a plane from which the upper portion of the nozzle 48 is inserted, a slot 50c in the I character shape that is seen from a side from which the flange 48a of the nozzle 48 is inserted, and a plurality of nozzle holders 50a located in the Y axis direction. A plurality of kinds of nozzles 48b, 48c and 48d, each having an optical path wherein ejecting form of the laser beam 51 is different from the other, are attachably and detachably supported by these nozzle holders 50a. A nozzle exchanging means is comprised of the magazine 50 and its driving source.

The CAM 6 gets the design information of the workpiece 3 (4) to be machined from the CAD5, a machining position, and machining quantity, machining condition of the workpiece 3 (4) (for example, tool to be used, rotational speed of a tool or the workpiece 4, depth of cut, feed speed and the like) are input so as to input in the numerically controlled machine of the machining center 1 (the numerically controlled lathe 2). The machining center 1 or the numerically controlled lathe 2 machines the workpiece 3 or 4, being controlled by the numerically controlled machine.

In case where partial hardening is necessary for the workpiece 3 (4), the CAM 7 takes the design information of the workpiece 3 (4), on which hardening machining is performed, out of the CAD5, and the three dimensional CAD image is displayed on the display so as to determine the hardening position of the workpiece 3 (4) on the display and so as to input material (dimension), width of hardening and depth of hardening of the workpiece 3 (4) through a keyboard.

The CAM 7 computes working conditions for hardening, such as laser output, frequency, duty, assist gas, defocus quantity, beam amplitude, beam amplitude frequency and axis feeding quantity from the information input on the basis of the database registered in the memory in advance, and the working conditions for hardening are input in the numerically controlled machine 8 of the laser beam hardening device 8.

At this time, the laser beam hardening device 8 waits until the nozzle 48 to be used for hardening is attached to the machining head 33 and machining finish signal is output from the machining center 1 or the numerically controlled lathe 2.

When the machining center 1 or the numerically controlled lathe 2 outputs the machining finish signal, the numerically controlled machine of the laser beam hardening device 8 operates the servo-motor 19 so as to move the saddle 18 to a predetermined position above the machine tools 1, 2 on which the workpieces 3, 4 to be hardened from now on are located along the guide 14 in the arrow X direction. Subsequently, the servo-motor 23 is operated so as to move the slider 22 in the arrow Y direction. As shown in FIG. 1, the machining head 33 is inserted into the machining area MA of the numerically controlled lathe 2 so as to move to the upper area of the portion to be hardened of the workpiece 4. And, the servo-motor 30 is operated such that the machining head 33 descends and an ejection opening 48e of the nozzle 48 faces the portion of the workpiece 4 to be hardened.

In this state, the laser beam hardening device 8 operates a laser beam oscillator so as to oscillate the laser beam 51.

Then, the oscillated laser beam 51 is reflected by the reflecting mirrors 10, 11 in the optical path 12, and is adjusted by the beam diameter adjuster 13 so as to have a predetermined diameter. Then, the laser beam 51 is injected into the saddle 18 through the optical path 51. The laser beam 51 injected into the saddle 18 is reflected by the reflecting mirror 20, and is injected in the slider 22 through an optical path (not shown), which is then reflected by the reflecting mirror 24 in the slider 22, and is injected in the base 34 of the machining head 33 through the sleeve 25. The laser beam 51 injected in the base 34 is reflected by the reflecting mirror 41 in the horizontal direction, and is injected in the top end portion 35, which then is reflected by the galvanomirror 47. Thereafter, the laser beam 51 is ejected out of the ejection opening 48c of the top end of the nozzle 48 through the condensing lens 49 so as to irradiate the workpiece 4.

When the numerically controlled lathe 2 rotates the workpiece 4 at a predetermined speed at this time, the outer peripheral face of the workpiece 4 can be annularly hardened. Besides, when the galvanomirror 47 is swung in the direction as shown by the arrow D of FIG. 4, the optical path of the laser beam 51 that is reflected by the galvanomirror 47 is changed so as to move the position for condensing the laser beam 51 on the workpiece 4 in the direction of the axis of the workpiece 4 (in the direction as shown by an arrow E). Then, the width of the portion to be hardened in the axial direction can be changed.

The position of the machining head 33 with respect to the sleeve 25 can be changed, swinging with the axial center CL1 as its center in the arrow A direction by operating the servo-motor 39. And, the angle of the nozzle 48 can be changed in the arrow B direction with the center axis CL2 as its center by operating the servo-motor 45. Then, the laser beam 51 can irradiate the workpiece 3 from an oblique direction also as shown in FIG. 1 so as to accurately harden.

When hardening on the workpiece 4 (3) finishes, the laser beam oscillator is transferred to a waiting condition, and the respective servo-motors 19, 23, 39 and 45 are operated so as to retreat the machining head 33 on the upper hand of FIG. 1 from the machining area MA and to move a predetermined waiting position. In case where hardening on the workpiece 3 or 4 machined by the other machine tool is successively instructed by the CAM 7, the laser beam hardening device 8 moves the machining head 33 for the workpiece 3 or 4 corresponding to the instruction along the guide 14 in a similar course as mentioned before so as to similarly harden.

The machining center 1 and the numerically controlled lathe 2 carry out the workpieces 3, 4 for the next routine after the hardening finishes. In case where additional machining is instructed after the hardening, additional machining is performed on the hardened portion according to the instruction and the workpieces 3, 4 are carried out for the next routine. At this time, hardening is performed in the state that the workpiece 3 or 4 is set on the machining center 1 or the numerically controlled lathe 2. Therefore, the machining error does not generate due to the dispersion of the attaching position when the workpiece 3 or 4 is attached to and detached from the machining center 1 or the numerically controlled lathe 2, and machining can be performed with high accuracy. Besides, the machining time on a workpiece including hardening work can be widely shortened.

When the nozzle 48 to be attached to the machining head 33 is exchanged, the sleeve 25 is contracted in the arrow Z direction by the operation of the servo-motor 30 so as to raise the machining head 33 and make it close to a position where the flange 48a of the nozzle 48 faces the slot 50c of the nozzle holder 50a, as shown in FIG. 5. The slider 22 is moved in the arrow Y direction by the operation of the servo-motor 23 so as to face a predetermined nozzle holder 50a which is an empty seat and the nozzle 48 each other as shown in FIG. 5, and the magazine 50 is moved in the X axis direction on the nozzle 48 side so as to insert the slot 50c of the nozzle holder 50a on the flange 48a.

When the servo-motor 30 is operated so as to contract the sleeve 25 in the above-mentioned state, the machining head 33 rises and is apart from the nozzle holder 50a. On the other hand, the nozzle 48 prevents the nozzle holder 50a from moving. Then, the nozzle 48 connected with the machining head 33 can be detached, and the nozzle 48 can be transferred to the magazine 50 from the machining head 33.

The slider 22 is moved in the arrow Y direction by the operation of the servo-motor 23 so as to move the machining head 33 on the upper hand of the nozzle 48 to be used next. And, the sleeve 25 is stretched by the operation of the servo-motor 30, and the machining head 33 is fitted in the nozzle 48 so as to connect with each other. When the magazine 50 is moved in the arrow X direction for making it apart from the machining head 33 by a driving source (not shown), the nozzle holder 50a is retreated from the nozzle 48, and the nozzle 48 can be transferred to the machining head 33 from the magazine 50. Various kinds of forms of relative movement between the 21 nozzle holder 50a and the machining head 33 can be adopted, and their driving systems are changed according to the respective relative movements.

FIG. 6 illustratively shows a portion of a workpiece to be hardened and a shape of the nozzle suitable for the portion to be hardened. FIG. 6(a) shows a shape of the nozzle 48b suitable for hardening an inner peripheral face Whs of a hole Wh formed at a cylindrical workpiece Wa in its axial center direction (the direction as shown by the arrows A and B). The nozzle 48b is provided with an optical path in the L character shape. Reflecting mirrors 52, 53 are provided at the bent portion and at the top end portion of the optical path. The laser beam 51 is ejected from the lower face of the top end portion of the nozzle 48b to the lower hand of the figure. With such a structure, hardening can be performed in such a manner that the top end portion of the nozzle 48b is inserted in the hole Wh, and is moved in the direction as shown by the arrows A and B, whereby the workpiece Wa is swung with its axial center as its center by the numerically controlled lathe 2 or the like.

FIG. 6(b) shows a shape of the nozzle 48c suitable for hardening machining on a side face Wis of a slot Wi, such as a key way, formed at an outer peripheral face of a workpiece Wb in a direction of an axial center of the workpiece Wb (the direction as shown by the arrows A and B). The nozzle 48c is provided with an optical path in the shape of a straight line, and the reflecting mirror 53 is provided at the top end portion of the nozzle having a size insertable in the slot Wi of the workpiece Wb. The laser beam 51 is ejected in a direction orthogonal to an axial center CL3 of the nozzle 48c. With such a structure, the side face Wis of the slot Wi can be hardened in such a manner that the top end portion of the nozzle 48c is inserted into the slot Wi and is moved in the direction as shown by the arrows A and B in the state of the workpiece Wb fixed.

FIG. 6(c) shows a shape of the nozzle 48d suitable for hardening machining on a side face Wjs of a slot Wj formed at an end face of a workpiece Wc. The nozzle 48d is provided with an optical path in the L character shape. The reflecting mirrors 52, 53 are provided at the bent portion and at the top end portion of the optical path. The laser beam 51 is ejected from the side face of the top end portion of the nozzle 48*d*. With such a structure, the side face Wjs of the slot Wj can be hardened in such a manner that the top end portion of the nozzle 48*d* is inserted in the slot Wj, and is moved in the direction as shown by the arrows C and D so as to be parallel to the side face Wjs.

Even in the case where the respective nozzles 48*b*, 48*c*, 48*d* shown in FIG. 6 are used, the position to be irradiated by the laser beam 51 can be swung by swinging the galvanomirror 47, and thus hardening can be performed on the width wider than the diameter on which the laser beam 51 is collected. Three kinds of shapes of the nozzle are shown in FIG. 6, and not limiting. The nozzle can be properly formed, fitting to the shape of the portion to be hardened.

The present invention is explained on the basis of the embodiment heretofore. The embodiments which are described in the present specification are illustrative and not limiting. The scope of the invention is designated by the accompanying claims and is not restricted by the descriptions of the specific embodiments. Accordingly, all the transformations and changes belonging to the claims are included in the scope of the present invention.

What is claimed is:

1. Laser beam hardening device, comprising:

a guide means provided in a horizontal direction;

a saddle provided at said guide means, being free to move along said guide means;

a machining head provided at said saddle, so as to be freely moved and driven upward and downward;

a nozzle attachably and detachably provided at said machining head, being capable of ejecting laser beam;

a magazine provided at said saddle, having a plurality of nozzle holders;

a holding portion for holding said nozzle in said nozzle holder, provided at each of both said nozzle and said nozzle holder, said nozzle attachably and detachably supported by said nozzle holder through said holding portion; and driving means for relatively driving said machining head close to or away from said nozzle holder, whereby said machining head is driven close to or away from said nozzle holder by said driving means, so that said nozzle can be exchanged between said machining head and said nozzle holder.

2. The laser beam hardening device as set forth in claim 1, wherein said guide means is provided, passing through an upper area of machining areas of a plurality of said machine tools.

3. The laser beam hardening device as set forth in claim 1, wherein a plurality of said nozzles are provided, and an optical path having different form of ejecting laser beam is formed at each nozzle.

4. The laser beam hardening device as set forth in claim 2, wherein said machining head is provided so as to be freely selectively inserted in or retreated from said machining areas of a plurality of said machining tools.

\* \* \* \* \*